United States Patent
Hofer

(10) Patent No.: US 6,665,762 B2
(45) Date of Patent: Dec. 16, 2003

(54) COMPUTER HAVING A PLURALITY OF PLUG-IN CARDS

(75) Inventor: Reinhold Hofer, Olching (DE)

(73) Assignee: Force Computers, Inc., Fremont, CA (US)

( * ) Notice: Subject to any disclaimer, the term of this patent is extended or adjusted under 35 U.S.C. 154(b) by 381 days.

(21) Appl. No.: 09/754,236

(22) Filed: Jan. 3, 2001

(65) Prior Publication Data

US 2002/0087776 A1 Jul. 4, 2002

(51) Int. Cl.[7] .............................................. G06F 13/00
(52) U.S. Cl. .................... 710/300; 710/14; 713/500; 714/40
(58) Field of Search ............. 714/40–42; 713/500–501; 710/11–14, 300–304

(56) References Cited

U.S. PATENT DOCUMENTS

| | | | |
|---|---|---|---|
| 4,969,089 A | | 11/1990 | Jakel |
| 5,293,589 A | | 3/1994 | Skordou et al. |
| 5,333,285 A | * | 7/1994 | Drerup ........................ 714/23 |
| 5,524,237 A | | 6/1996 | Bestler et al. |
| 5,572,718 A | | 11/1996 | Scriber et al. |
| 5,613,094 A | | 3/1997 | Khan et al. |
| 5,831,346 A | | 11/1998 | Baumann et al. |
| 6,055,593 A | * | 4/2000 | Shaberman et al. .......... 710/74 |
| 6,161,150 A | * | 12/2000 | Sudhakaran et al. ........... 710/8 |
| 6,209,099 B1 | * | 3/2001 | Saunders .................... 713/200 |
| 6,241,755 B1 | * | 6/2001 | Arnold et al. ............... 607/104 |
| 6,247,142 B1 | * | 6/2001 | Wong et al. .................... 714/5 |
| 2002/0087776 A1 | * | 7/2002 | Hofer ........................ 710/301 |

FOREIGN PATENT DOCUMENTS

| | | |
|---|---|---|
| DE | 4240145 A1 | 6/1994 |
| DE | 19859483 A1 | 7/2000 |

OTHER PUBLICATIONS

Joseph Desposito, "Bridge Chip Imparts A Universal Spin to CompactPCI Sing–Board Computer", Electronic Design, Feb. 7, 2000, Copyright 2000 by Penton Media, Inc.
Intel 21555 Non–Transparent PCT–to–PCI Bridge, Advance Information Datasheet, Product Features, pp. 4–9.
Intel 21150 PCI–to–PCI Bridge, Brief Datasheet, Product Features, pp. 1–4, Oct. 1998.
D.S. Garriss, Switchable Clock Generator, in: IBM Technical Disclosure Bulletin, vol. 20, No. 11B, Apr. 1978, pp. 4889–4890.

* cited by examiner

Primary Examiner—Christopher B. Shin
(74) Attorney, Agent, or Firm—Thelen Reid & Priest LLP; Robert E. Krebs

(57) ABSTRACT

In a computer comprising a plurality of plug-in cards and peripheral plug-in cards interconnected through a bus, plug-in places of the bus are designed as system plug-in places and peripheral plug-in places. A clock line is routed along respective clock jack contacts at the plug-in places and comprises an associated clock plug-in contact on a plug-in card. A universal plug-in card (14) comprises a control plug-in contact (24) which is capable of being connected with a control plug-in jack (22) of the bus (12) and activates a clock output signal of the plug-in card (14) which may be supplied to the bus (12) via the clock plug-in contact (C_LK0). The card (14) is capable of working in a peripheral mode in which a clock plug-in contact (C_LK0) acts as a clock input.

18 Claims, 3 Drawing Sheets

COMPUTER HAVING A PLURALITY OF PLUG-IN CARDS

BACKGROUND OF THE INVENTION

The invention relates to a computer in accordance with the preamble of claim 1, which comprises a plurality of plug-in cards.

The like computers are used in manifold designs and may particularly be employed when it is a matter of flexibly solving various tasks through several system plug-in cards and peripheral plug-in cards. As system plug-in cards it is, e.g., possible to use plug-in cards acting as bus masters. As peripheral plug-in cards it is possible to employ plug-in cards providing most variegated functions, for example performing input/output to cache memories, acquisition and processing of signals, outputting correspondingly processed signals for controlling, e.g., control elements intervening in industrial processes, but also communication components for transferring the data flow in a processed manner from and to the computer, for example via digital telephone lines.

In modern computers it is also possible to apply several system plug-in cards in order to increase computing speed and data throughput depending on the user's requirements, or on the other hand to be able to simultaneously solve various tasks by using one computer.

One problem of such plural master or system plug-in cards resides in the fact that their clock signals must be synchronized. In low-cost bus systems one frequently reverts to providing a bus clock signal which is many times slower than the local system clock. The PCI bus, for example, is designed for a maximum clock frequency of 66 MHZ.

It has therefore already been suggested to fundamentally define one plug-in place, or slot, as a clock or master slot and supply the clock signal thereof to the other plug-in places, thus also to those plug-in places provided for system plug-in cards.

In this proposal it is, however, particularly disadvantageous that a constant precondition is to at least also mount the system plug-in card in the master plug-in place of the bus; in a case where the respective plug-in card is missing if only for testing purposes, the computer will be blocked altogether as it will then not be possible to generate slave clocks.

This system of a master plug-in place, for example in slot 1, fundamentally is in contradiction with the concept of a universal bus.

A universal bus should be functional independent of whether or not a particular plug-in place is provided with a particular card, at least when the bus is designed as a genuine bus, i.e. with mutually corresponding signals at the respective plug-in jacks.

Moreover it is known from U.S. Pat. No. 5,524,237 to synchronize clock signals between two microprocessors with each other. To this end, the clock lines of the two microprocessors are mutually connected with each other. Depending on whether a respective microprocessor receives or transmits data, clock input and clock output are toggled, so that the associated clock will correspondingly be active for data supplied by a microprocessor.

Herein the particular expenditure for the software-side synchronization constitutes a drawback. In addition, when the transmission direction is switched over by means of a kind of safety circuit, it must be made sure that the respective other microprocessor will generate the clock following completion of data transmission by a microprocessor. It is disadvantageous that this circuit permits not a genuine bus operation but merely the coordination of two microprocessors capable of mutually supplying data.

From DE 42 40 145 a system bus with a plurality of boards is known. If a master board fails, there will be no clock signal on the system bus and means are provided to generate clock signals locally on each board. The disadvantage of this system is, however, that the local clock signals are not synchronized to each other.

Furthermore it has already been suggested to split clock signals in genuine bus systems between system plug-in cards and peripheral plug-in cards, whereby it is possible to provide several clock signals through the bus. A proposed specification permits a maximum deviation of 2 ns between the clock signals of two bus plug-in cards.

Particularly when buffered slave clocks are additionally provided, it is difficult to observe this time frame.

In order to improve signal quality, it has become known in this context to terminate the bus lines. Nevertheless this does not take into account those problems possibly resulting from the use of several system plug-in cards.

SUMMARY OF THE INVENTION

The invention is therefore based on the object of furnishing a computer in accordance with the preamble of claim 1, which permits a flexible configuration despite the realization of fast clock signals through the bus.

This object is attained in accordance with the invention by claim 1. Advantageous developments result from the appended claims.

In accordance with the invention it is particularly favorable that a fast system clock is generated under the condition that a universal plug-in card is inserted in any place whatsoever of the bus, either in peripheral or system plug-in places.

It is furthermore particularly favorable in accordance with the invention that automatically, by insertion in the corresponding location, a universal plug-in, card will or will not output a clock signal as a basic system clock. This function is fulfilled in accordance with the invention by a tristate buffer circuit wherein as a result of inserting the card at a system plug-in place, the internally generated clock signal is looped through, whereas this very feed-through is suppressed upon insertion in a peripheral plug-in place; as a result, there is no danger of a system plug-in card inserted there outputting a clock signal on a same bus line concurrently with another system plug-in card, in which case the operation of two logic circuits would be in mutual conflict.

In accordance with an advantageous design it is provided to form only one plug-in place as a system plug-in place independently of how the bus or the backplane is equipped, a clock collision may accordingly be automatically prevented from occurring in this embodiment. It is nevertheless possible to readily use several universal plug-in cards, so that flexible and mixed mounting may be used depending on the customer's profile of requirements.

In accordance with a particularly favorable design it is provided to form the clock terminal for the clock plug-in contact as a bi-directional path. Depending on the application case, the line path may then be used for inputting the clock signal into the bus or for supplying the clock signal from the bus to the plug-in card.

In accordance with a particularly favorable aspect of the invention it is possible to use an ASIC for realization of a bus bridge circuit. When the system bus has the form of a CompactPCI bus, the ASIC may operate as a PCI-to-PCI bridge, and a local PCI bus serving as a local bus, for example of a peripheral plug-in card, may additionally be provided.

In accordance with another advantageous design of this aspect, the ASIC may then also be mounted in a rotated position so as to provide the clock control function depending on the application case, also with respect to the local PCI bus. To this end, a symmetrical pin design of the ASIC is necessary.

According to an advantageous development of the invention, means are provided to reduce the skew between clock lines, e.g., the bus slave clock lines or when switching between the two different conditions of the universal plug-in card.

Different line lengths for propagating the clock lead to different propagation times. Also, buffers and all other asynchronous logic circuits vary in delay time. Yet, it would be desirous to have all clock signals synchronized. With an important aspect of the invention, both internal and external skew is reduced such that the clock handling of the plug-in card according to the invention is independent from production parameters when producing gates or buffers. Moreover, the influence from voltage and temperature deviations is reduced. With the internal skew optimization circuit, the skew is reduced to 20 ps, and the overall skew is reduced to 100 ps.

According to a specifically advantageous aspect of the invention, there is a skew optimization arrangement on the plug-in card which delays the clock signal exactly by the same time when acting as system plug-in card as the propagation time via the bus clock line when acting a peripheral plug-in card

BRIEF DESCRIPTION OF THE DRAWINGS

Further advantages, details and features result from the following description of the invention making reference to the drawings.

DETAILED DESCRIPTION OF THE INVENTION

Figure 1:
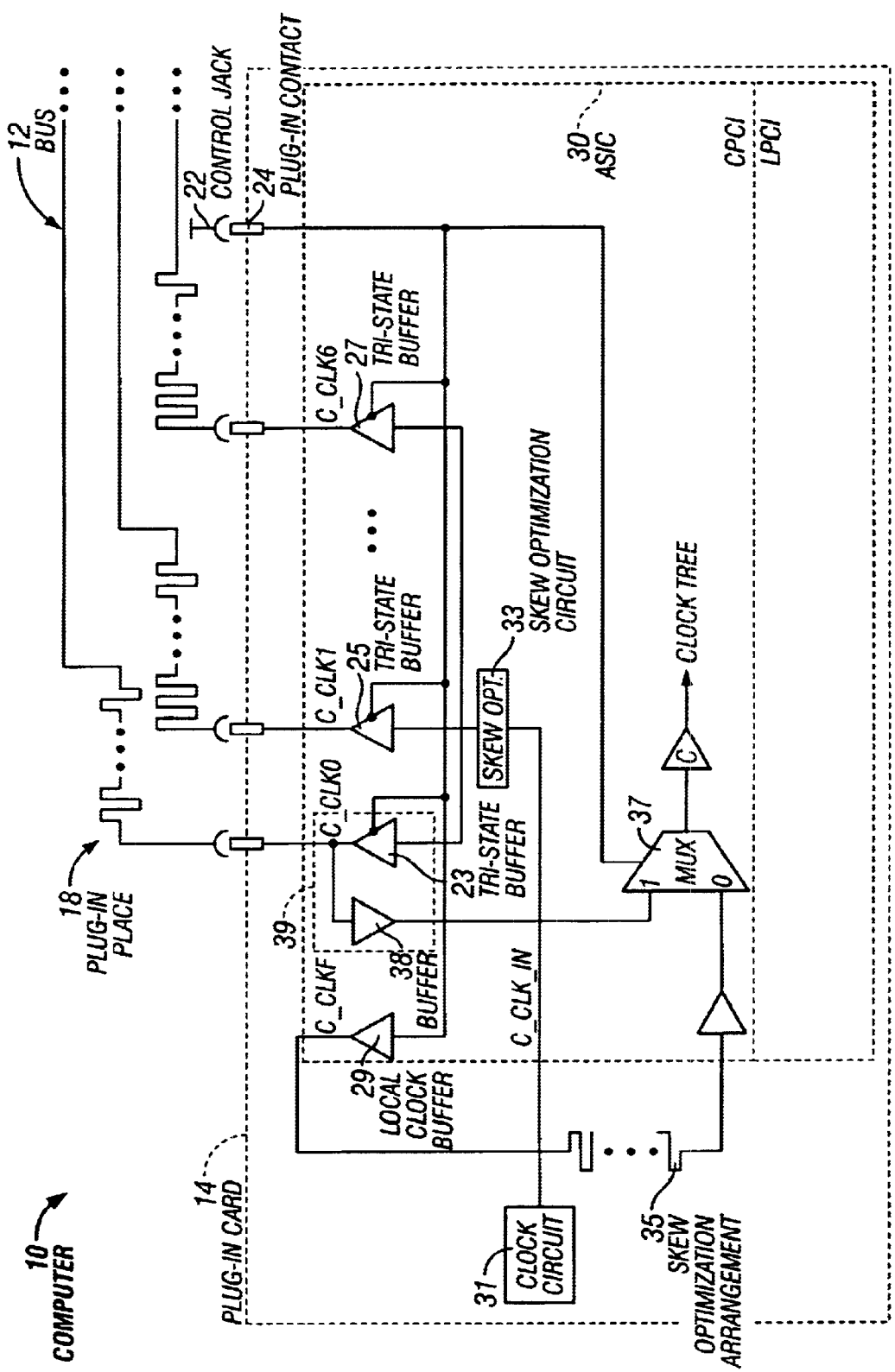
FIG. 1 shows a part of one embodiment of a plug-in card of a computer according to the invention.

The computer 10 partly represented in FIG. 1 comprises a bus 12 which is designed as a CompactPCI bus. In a manner known per se, the bus includes a plurality of data and address lines, with a plurality, such as 6 to 7, different plug-in places being provided wherein either peripheral plug-in cards or system plug-in cards may be inserted. In the figure, a universal plug-in card 14 is indicated schematically.

In the represented example, the plug-in card 14 is inserted in a system plug-in place. In accordance with the invention it is also possible to insert the plug-in card 14 in any peripheral plug-in place 20 whatsoever, and it may furthermore be inserted in any system plug-in place 18 whatsoever as long as it is ensured that at least one system plug-in card is present in the system.

FIG. 1 shows the card 14 plugged in a system plug-in place 18. This place or slot comprises a control jack 22 which is grounded and adapted to be connected to a control plug-in contact 24. If the card 14 is plugged into a peripheral slot or plug-in place, there is no control jack 22 such that the contact 24 is not connected.

Contact 24 is connected with control inputs of a plurality of tri-state buffers 23, 25 and 27 as well as to a local cluck buffer 29. The enable inputs are zero active such that when contact 24 is grounded the buffers 23 to 27 are active and supply a clock signal CLK0 to CLK6 from clock circuit 31 via a skew optimization circuit 33 to the bus clock lines CLK0 to CLK6.

Also, the local clock buffer 29 supplies the clock signal CLKF to a skew optimization arrangement 35 and then further to a system input clock.

The system input clock signal is supplied to one input "0" of a multiplexer 37. The multiplexer 37 is controlled by the signal on contact 24 such that input "0" is active in the system condition of the card 14. The output of the multiplexer 37 provides the local clock signal which is supplied to the clock tree and used on a local PCI bus LPCI which is part of the board 14.

With the exception of the internal clock circuit 31 and the skew optimization arrangement 35, all parts of the board design of card 14 as discussed above are arranged in an ASIC 30.

In the peripheral condition of card 14, contact 24 is not connected to ground. Thus, the tri-state buffers 23 to 27 are not active. However, a clock is active on line CLK0 of bus 12 which is generated by a system card not shown in FIG. 1. This clock is supplied via contact C_CLK0 to a buffer 38 which together with tri-state buffer 23 form a bi-directional cell 39. The output of buffer 38 is connected to the other input "1" of multiplexer 37 such that the signal on CLK0 is supplied to the clock tree if contact 24 is not grounded.

Figure 2:
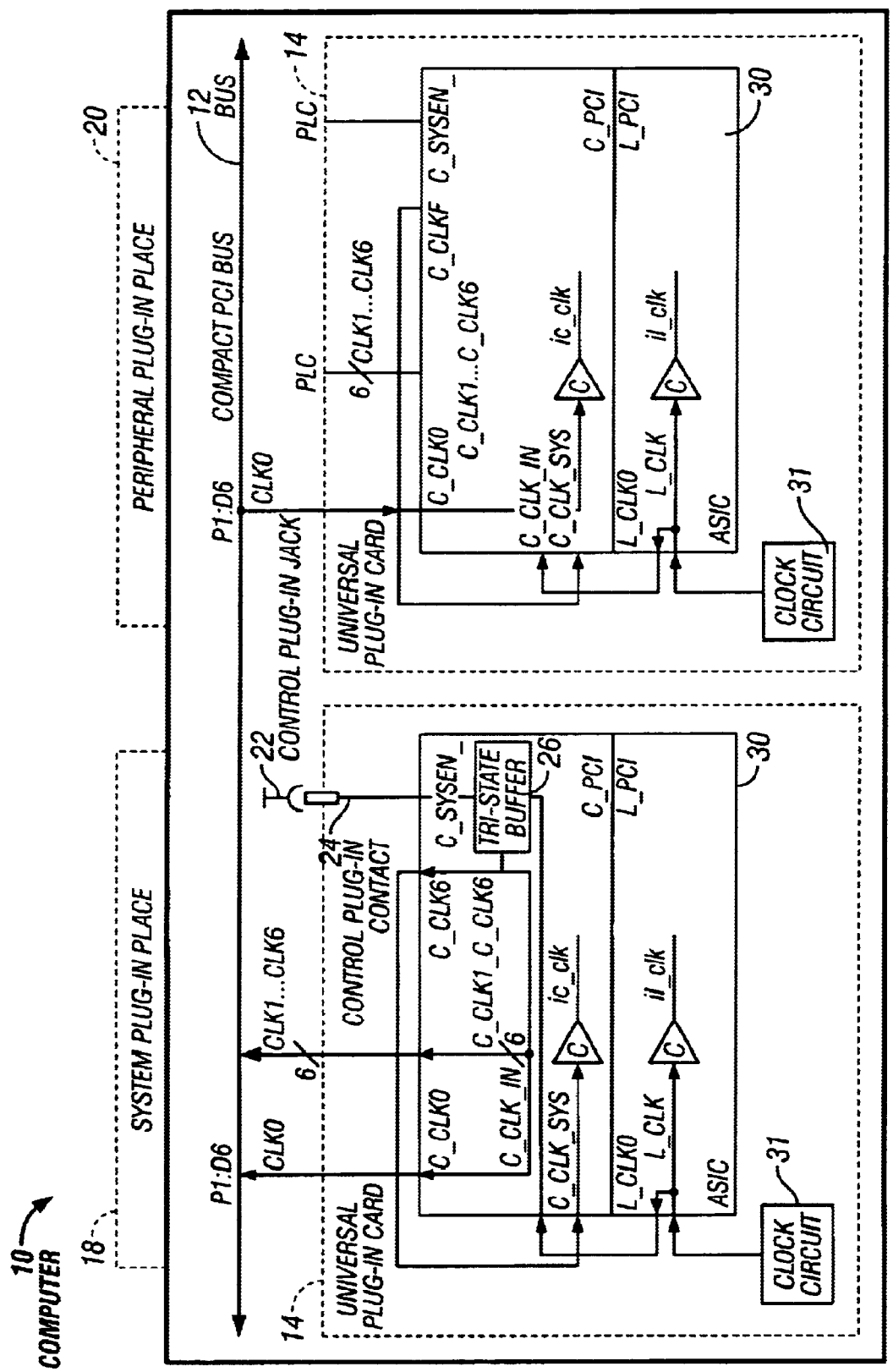
FIG. 2 shows the signal paths for the plug-in card according to the invention when acting as system card and as peripheral card.

FIG. 2 shows the signal paths in the two conditions of card 14. At reference numeral 18, the system condition is shown while at reference numeral 20 the peripheral condition is shown.

Each plug-in place in FIG. 2 comprises a clock jack contact, in the present instance designated as P1:D6. Moreover each plug-in place comprises jacks for slave clocks CLK1–CLK6, with the card acting a peripheral plug-in card not presenting any slave clock contact plug-in contacts, as the slave clocks are not generated by the peripheral plug-in card.

Moreover each system plug-in place 18 comprises a control plug-in jack 22 intended for insertion of a control plug-in contact 24 of the system plug-in card. A corresponding control plug-in jack is missing at the peripheral plug-in place 20.

The control plug-in contact 24 of the universal plug-in card in place 18 is connected with a tri-state buffer 26, which is shown as a block comprising the tristate buffers 23 to 27 of FIG. 1. The tri-state buffer 26 supplies a local clock signal L_CLK0 to a clock output C_CLK0 and via the latter to the clock plug-in contact P1:D6 when the control plug-in contact 24 is connected with the control plug-in jack 22, while precluding such supply when this is not the case.

The universal plug-in card 14 does not output clock output signal CLK0 when inserted in a peripheral plug-in place 20.

Based on the clock signal at output C_CLK0, the slave clocks CLK1–CLK6 are generated is a manner known per se. Another slave clock CLKF is further used, as a local clock and again supplied to the ASIC 30.

A particular advantage may be achieved owing to this feedback, so that minimum skew is obtained between CLK0 . . . 6 and CLKF. Any temperature and voltage influences of the ASIC 30 on the clock signals are hereby precluded, with tolerance against sample skew of the ASIC due to the manufacturing process being improved at the same time.

As may be taken from FIG. 2, the ASIC 30 comprises a C_PCI part that serves for operating the CompactPCI buses, while another part, referred to as L_PCI, is used for controlling the local PCI bus. Herein the ASIC is supplied with a local clock 32 which is both further used internally and supplied as a signal L_CLK0 to the part C_PCI of the ASIC.

A corresponding structure is also present when the card is used of peripheral place 20, wherein the same ASIC may be used, the function of which is, however, deactivated by separating the line C_SYSEN_, i.e. separation of control plug-in contact 24.

Tri-state buffer 26, although correspondingly provided in the ASIC 30 of the peripheral plug-in card 16, is nevertheless ineffective, so that the local clock signal L_CLK cannot be supplied to the CompactPCI bus as a clock output signal in any case.

Figure 3:
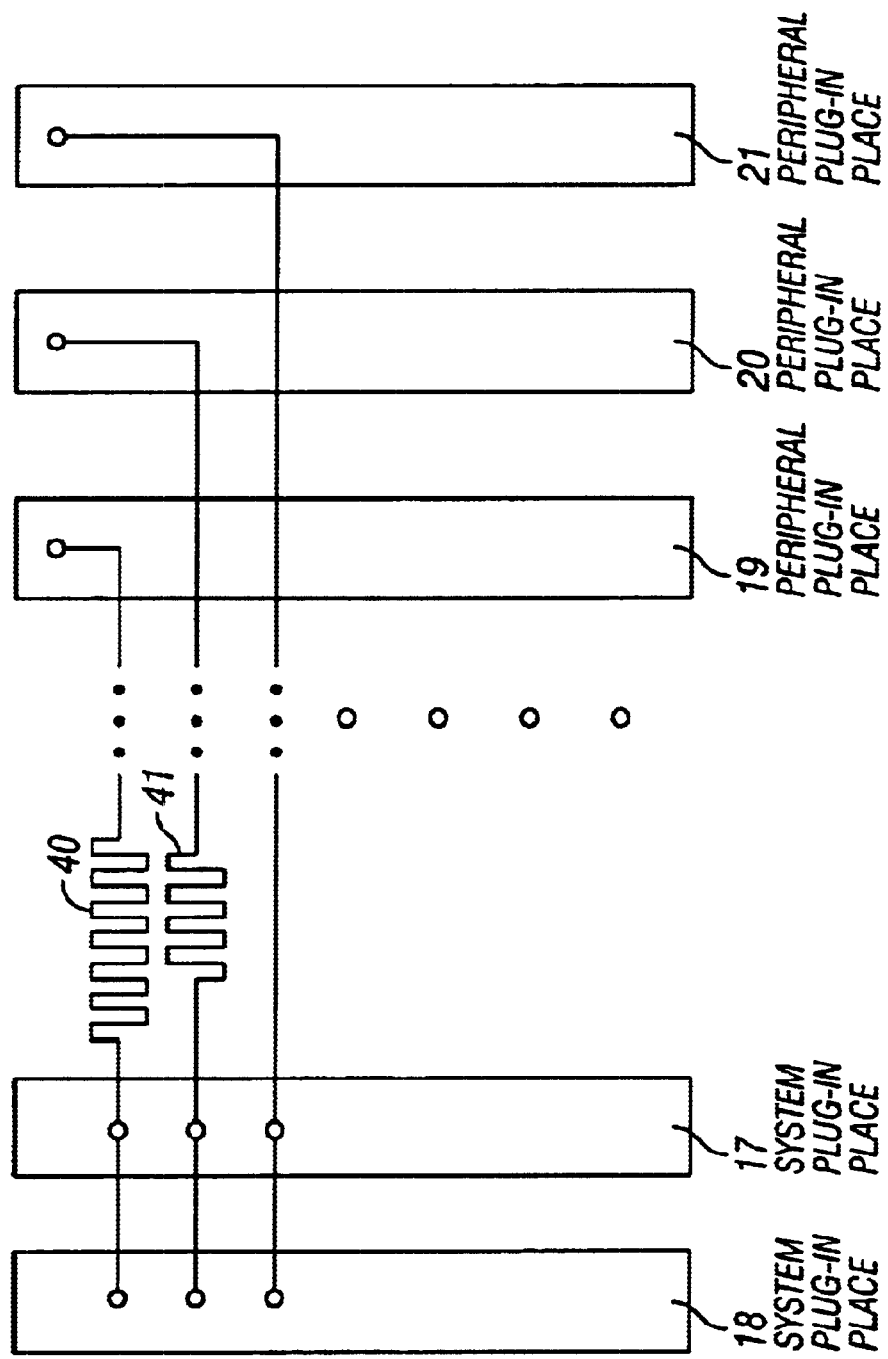
FIG. 3 shows the clock line arrangement on a mother board for a computer according to the invention.

FIG. 3 shows two system plug-in places 18 and 17 and three peripheral plug-in places 19, 20 and 21.

The closest peripheral place 19 has a meander-shaped clock line arrangement of above clock line CLK0 while the line arrangement for peripheral place 20 is shorter and less meander-shaped. Place 21 does not have any such arrangement. The overall line length of the lines thus is harmonized in order to reuse the external skew.

What is claimed is:

1. A computer capable of being provided with a plurality of system plug-in cards and peripheral plug-in cards interconnected through a bus, with plug-in places of the bus being formed as system plug-in places and peripheral plug-in places, a plurality of data lines and address lines and a clock line routed along respective clock jack contacts at said plug-in places, and with an associated clock plug-in contact on at least some of said plug-in cards, characterized in that a universal plug-in card is provided which is capable of working as a system plug-in card and as a peripheral plug-in card and which comprises a control plug-in contact which is capable of being connected with a control plug-in jack of the bus and which activates a clock output signal of said universal plug-in card which may be supplied to the clock line of said bus, via a clock plug-in contact, if said universal plug-in card works as a system plug-in card, and that said plug-in contact acts as a clock input for said universal plug-in card if it works as a peripheral plug-in card.

2. The computer according to claim 1, characterized in that said universal plug-in card is capable of being inserted in system plug-in places and in peripheral plug-in places, and that the clock output signal of said universal plug-in card is activated upon insertion in system plug-in places and deactivated upon insertion in peripheral plug-in places.

3. The computer according to claim 1, characterized in that the clock plug-in contact of said universal plug-in card is connected to the output of a tri-state buffer, the input of which is connected to the control plug-in contact of the plug-in card, and in that the local clock signal generated by said universal plug-in card is supplied to a clock line of the bus if the control plug-in contact activates the tri-state buffer.

4. The computer according to claim 1, 2, or 3, characterized in that said universal plug-in card includes a local clock signal for generating several slave clocks which are supplied to the bus, depending on the logic level on the control plug-in contact.

5. The computer according to claim 4, characterized in that the slave clocks are supplied to the bus via clock buffers.

6. The computer according to claim 5, characterized in that said clock buffers are tri-state buffers which are controlled by the control plug-in contact.

7. The computer according to claim 1, characterized in that if said control plug-in contact is not connected, said universal plug-in card works as peripheral plug-in card and receives its clock from the clock line of the bus via the clock plug-in contact and evaluates the clock signal to obtain local clock signals and/or slave clock signals.

8. The computer according to claim 1, characterized in that said clock plug-in contact is connected to a bi-directional cell comprising said tri-state buffer and a logic circuit, the input of which is connected to the clock plug-in contact.

9. The computer according to claim 1, characterized in that said universal plug-in card comprises a clock circuit providing a plurality of clock signals via additional clock plug-in contacts to be supplied to slave clock lines of the bus.

10. The computer according to claim 9, characterized in that said local clock signal is supplied to a local clock buffer from which it is further supplied to obtain a local clock signal if the control plug-in contact activates the plug-in card such that it works as a system plug-in card.

11. The computer according to claim 1, characterized in that said control plug-in contact activates a multiplexer, one input of which is connected to a local clock buffer and the other input of which is connected to the clock plug-in contact such that the local clock signal is generated from the local clock buffer if the control plug-in contact is connected and is generated from the bus clock line via the clock plug-contact if the control plug-in contact is not connected.

12. The computer according to claim 1, characterized in that the bus is designed as a CompactPCI bus and a local add-on bus is designed as a local PCI bus, and an ASIC (application-specific IC) forms a PCI-to-PCI-bridge (bus bridge) on the plug-in card.

13. The computer according to claim 12, characterized in that the ASIC has a symmetrical structure relative to the terminal contact signals of the Compact PCI bus and of the local PCI bus.

14. The computer according to claim 13, characterized in that the ASIC, when mounted in a rotated position, provides the functions provided relative to the CompactPCI bus for the local PCI bus.

15. he computer according to claim 1, characterized in that one of the slave clocks is connected with the system input clock of the ASIC.

16. The computer according to claim 1, characterized in that the bus comprises a clock line and at least one slave clock line and the line length between each peripheral plug-in place and the system plug-in place or the system plug-in places is adapted to be equal in order to equalize the clock propagation times to each other.

17. The computer according to claim 1, characterized in that the plug-in card comprises a card based skew optimization arrangement simulating the line length of the bus clock line when working as a peripheral plug-in card.

18. The computer according to claim 1, characterized in that a skew optimization circuit is provided in an ASIC of the plug-in card which equalizes the signal propagation from an internal clock circuit to a master clock buffer, slave clock buffers and/or to clock buffers.

* * * * *